United States Patent [19]

Butler et al.

[11] 4,358,235
[45] Nov. 9, 1982

[54] ADJUSTABLE CROSS CONVEYOR FOR BALE HANDLING APPARATUS

[75] Inventors: L. Dennis Butler, Kingsburg; Leonid Mankin, Selma, both of Calif.

[73] Assignee: Sperry Corporation, New Holland, Pa.

[21] Appl. No.: 187,012

[22] Filed: Sep. 15, 1980

[51] Int. Cl.³ .............................................. A01D 87/12
[52] U.S. Cl. ...................................... 414/24.5; 74/103; 198/739; 414/111; 414/501; 414/525 R; 414/900
[58] Field of Search ........................ 414/24.5, 24.6, 44, 414/68, 111, 501, 511, 516, 525 R, 679, 749, 900; 198/489, 490, 738, 739; 74/101, 103

[56] References Cited

U.S. PATENT DOCUMENTS

| | | | |
|---|---|---|---|
| 2,739,718 | 3/1956 | Birchall | 414/68 X |
| 3,139,196 | 6/1964 | Legocki | 414/111 |
| 3,523,616 | 8/1970 | Neely | 414/44 X |
| 3,853,213 | 12/1974 | Lehman et al. | 198/429 |
| 4,047,628 | 9/1977 | Havens | 414/44 |
| 4,259,034 | 3/1981 | Ward et al. | 414/501 X |
| 4,261,676 | 4/1981 | Balling | 414/501 X |

FOREIGN PATENT DOCUMENTS

1410170 10/1975 United Kingdom ................. 414/111

*Primary Examiner*—Leslie J. Paperner
*Attorney, Agent, or Firm*—Larry W. Miller; Frank A. Seemar

[57] ABSTRACT

A bale handling apparatus picks up a load of large round bales from the field, transports the load and then dumps the load at a storage area. The apparatus includes a transporter bed and has the ability to arrange and control the position of the bales on the bed after being picked up. The versatile apparatus is preferably self-propelled to function as both an on-road and agricultural field vehicle. A cross-conveyor moves bales transversely on the bed. The cross conveyor includes a linkage, a cross conveyor arm and an adjustment plate. A plurality of adjustment positioners are along an arc on the plate for permitting the conveyor arm to be adjusted so that various size bales are transversely conveyed from a variable first position to a consistent second position.

4 Claims, 10 Drawing Figures

ADJUSTABLE CROSS CONVEYOR FOR BALE HANDLING APPARATUS

BACKGROUND OF THE INVENTION

This invention relates generally to material or article handling and, more specifically, to vehicles which are self-loading or unloading and include successive handling means.

The evolution of the hay industry in recent years indicates a diversification in baling, storing and transporting hay with a strong trend toward using larger bales. Large round bales, varying in weight from about 800 pounds to about 1600 pounds and varying in width from about four feet to about six feet, are rapidly replacing the relatively smaller conventional bales.

Due to the large size of round bales, there is a need for equipment which can pick up the bales in the field, transport the bales to a remote storage area and deposit or dump large loads of round bales at the storage area. Also, such equipment must be flexible in the ability to deal with bales ranging in width from the aforesaid four to six feet. Furthermore, it is important that the bale handling equipment be able to arrange and control the position of bales on the transporter bed after the bales have been picked up. Transporting larger loads of bales reduces fuel usage and the time required for bale handling.

Currently known round bale equipment is limited in being able to successfully pick up, transport and dump large loads of round bales, e.g., eight to ten bales, and cope with the varying bale size. Some equipment is available for handling large loads of bales but this equipment is tractor drawn and is thus limited by tractor speed and reduced maneuverability. Other equipment available is self-propelled, such as a pickup truck attachment for handling large bales. While this other equipment avoids the speed and maneuverability limitations of tractor drawn equipment, it sacrifices the economic advantage associated with transporting a large number of bales.

In controlling the position of bales on the transporter bed, it is important to be able to accommodate various size bales. For example, a mechanical linkage which cycles through repetitive motions to move or cross-convey a bale from a first position to a second position may perform satisfactorily while handling bales of one size, however, when handling bales of a second size, the linkage movement may not engage and disengage the bale properly and may not deliver the bale to the same second position.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a bale handling apparatus including a linkage and a cross conveyor connected for movement with the linkage. A hydraulic actuator, such as a piston and cylinder, is connected for moving the linkage. An adjustment plate is connected for movement with the arm and includes a plurality of adjustment positioners are formed along an arc on the plate.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

The figures illustrate an embodiment of the bale handling apparatus of this invention. In essence the apparatus, generally designated 10, has the ability to function as an off-highway agricultural vehicle capable of good maneuverability and low speed for picking up bales, and also has the ability to function as an over the road vehicle having a maximum speed of about 45 mph when empty.

Vehicle 10 (FIG. 1) is self-propelled, preferably by a 354 cubic inch engine 12 sold under the trademane PERKINS. Suitable steel is used to construct the vehicle 10 sufficient to safely handle loads equivalent in weight to 8–6 foot wide bales or 10–4 foot wide bales. An appropriate undercarriage or frame 110 and transmission are matched to satisfy the vehicle load requirements. Components are commercially available. A comfort-type cab 14 may include an air conditioning and a stereo sound system if desired. Cab 14 is offset to the far side of vehicle 10 as viewed in FIG. 1.

Vehicle 10 includes a pivotal bed 16 having a pivotal tailgate 18. Means 20 is provided beside cab 14 for sequentially picking up round bales from adjacent ground surface G, and then pivoting to deposit the bales on bed 16. Means 22 is provided for pivoting to cross convey the bales on the bed 16 from a position where the bales were deposited to another position behind cab 14, thus forming a first double wide row 24 of bales. Means 26 can be pivoted to urge or advance bales from first row 24 to a second row position 28. The sequence is repeated until bed 16 holds a full load of bales.

A major feature of this invention includes means 30 for retaining bales in a first row position 24 during deposit by pickup means 20, during cross-conveying by means 22 and, after the bales are advanced to second row position 28 by means 26, means 30 retains the bales positioned in row 28 so as not to interfere with subsequent bales being deposited and cross-conveyed in row 24. Of course, once bales fill both rows 24,28, means 26 advances both rows so that eventually third, fourth rows 32,34, etc. are occupied. Here once again, means 30 continues to perform multiple functions of retaining and guiding bales positioned for deposit and cross-conveying, and positioned so as not to interfere with subsequent bales being deposited and cross-conveyed.

Once bed 16 is filled, the bales can be transported to a storage site. There, bed 16 can be pivotally raised to a dump position and gate 18 can be pivotally lowered to release and dump the bales where desired. The sequence can be repeated until all bales are picked up from the bale forming site in the field and deposited in the desired storage area.

The means 20 for picking up and depositing bales, means 22 for cross-conveying, means 26 for advancing pivoting of bed 16 and pivoting of gate 18 are all actuated preferably by means of a hydraulic system including hydraulic cylinders and appropriate controls. Such a system can be constructed from commercially available components. Of course, electronic controls can be used also, either wholly or in combination with hydraulics. However, it is preferred to use a fully hydraulic system for maximum economy. For purposes of this invention, it has been found that a suitable hydraulic system requires a maximum operating capability of about 2000 psi.

Figure 4:
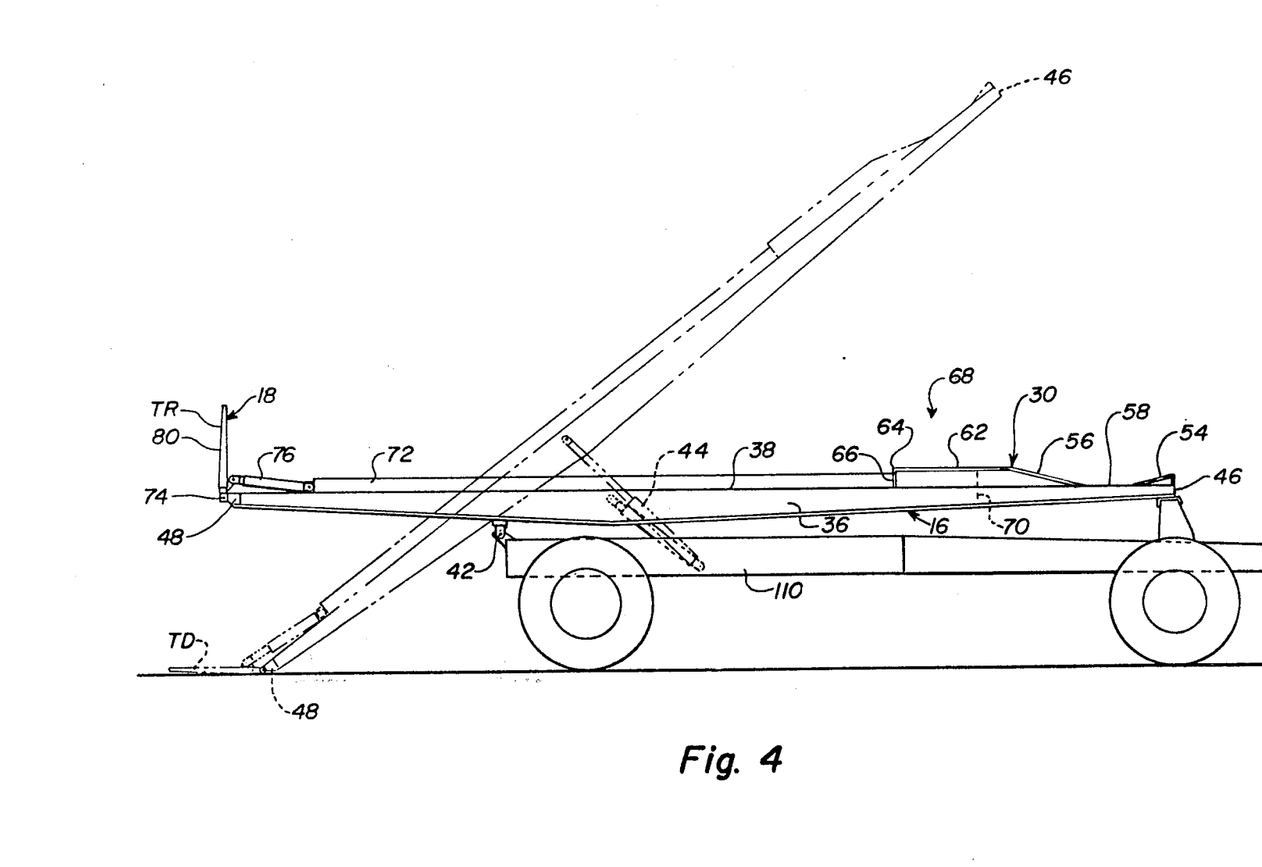
FIG. 4 is a partial side elevational view illustrating an embodiment of the dump bed of this invention.
Figures 5, 8:
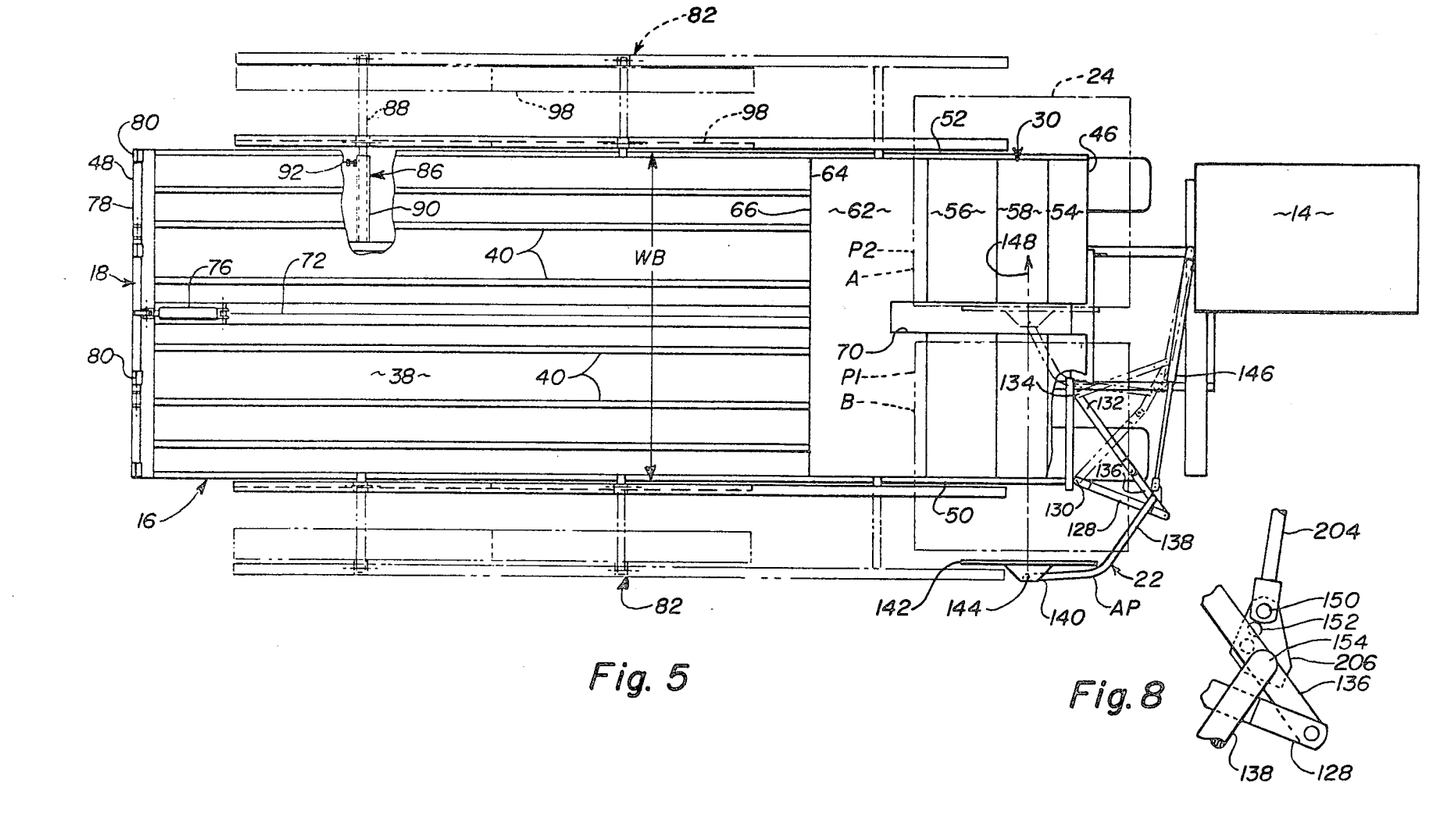
FIG. 5 is a top view illustrating an embodiment of the bale handling apparatus of this invention taken along line V—V of FIG. 1.
FIG. 8 is an enlarged partial view illustrating an embodiment of the cross conveyor of this invention connected to an associated hydraulic actuator.

Bed 16, FIGS. 4 and 5, includes suitable steel frame members 36 (only one shown) for support. A bed surface 38 is of sheet steel welded to frame 36 and may include a plurality of grooves 40 for added strength. Bed 16 is pivotally connected to undercarriage 110 of vehicle 10 at a pivot point 42. A pair of hydraulic cylinders 44 (only one shown) are operably connected for pivoting bed 16 to a dumping position so that a first end 46 is raised and a second end 48 is lowered for dumping bales.

First end 46 of bed 16, adjacent cab 14, includes retainer means 30 which extends from a first side 50 to a second side 52. Retainer 30 includes a first ramp 54 immediately adjacent first end 46 and a second ramp 56 spaced from end 46. A recessed portion 58 separates ramps 54,56. In this manner, a cradle-like first portion 60 of retainer 30 is formed for receiving deposited bales and guiding cross-conveyed bales in first row 24. Retainer 30 also includes a raised, substantially planar portion 62 extending from ramp 56. Portion 62 terminates abruptly at an edge 64 which joins surface 38 of bed 16 to form a stop 66. In this manner, a second portion 68 of retainer 30 is formed for retaining bales advanced by advance means 26 in second row 28 so as not to interfere with subsequent bales being deposited and cross-conveyed in first row 24.

A slot 70 is formed in bed 16 and retainer 30. Slot 70 extends from first end 46 to portion 62 for accommodating pivotal movement of advance means 26, see also FIG. 3. A raised separator 72 extends from stop 66 to second end 48 of bed 16. Separator 72 substantially divides bed 16 into halves for maintaining separation of the double wide rows of bales.

Second end 48 of bed 16 includes gate 18 pivotally connected to bed 16 at a pivot point 74. A hydraulic cylinder 76 is operably connected for pivoting gate 18 from a bale retaining position TR to a bale dumping position TD. Gate 18 includes a main cross member 78 which interconnects and supports pickets 80.

Figure 1:
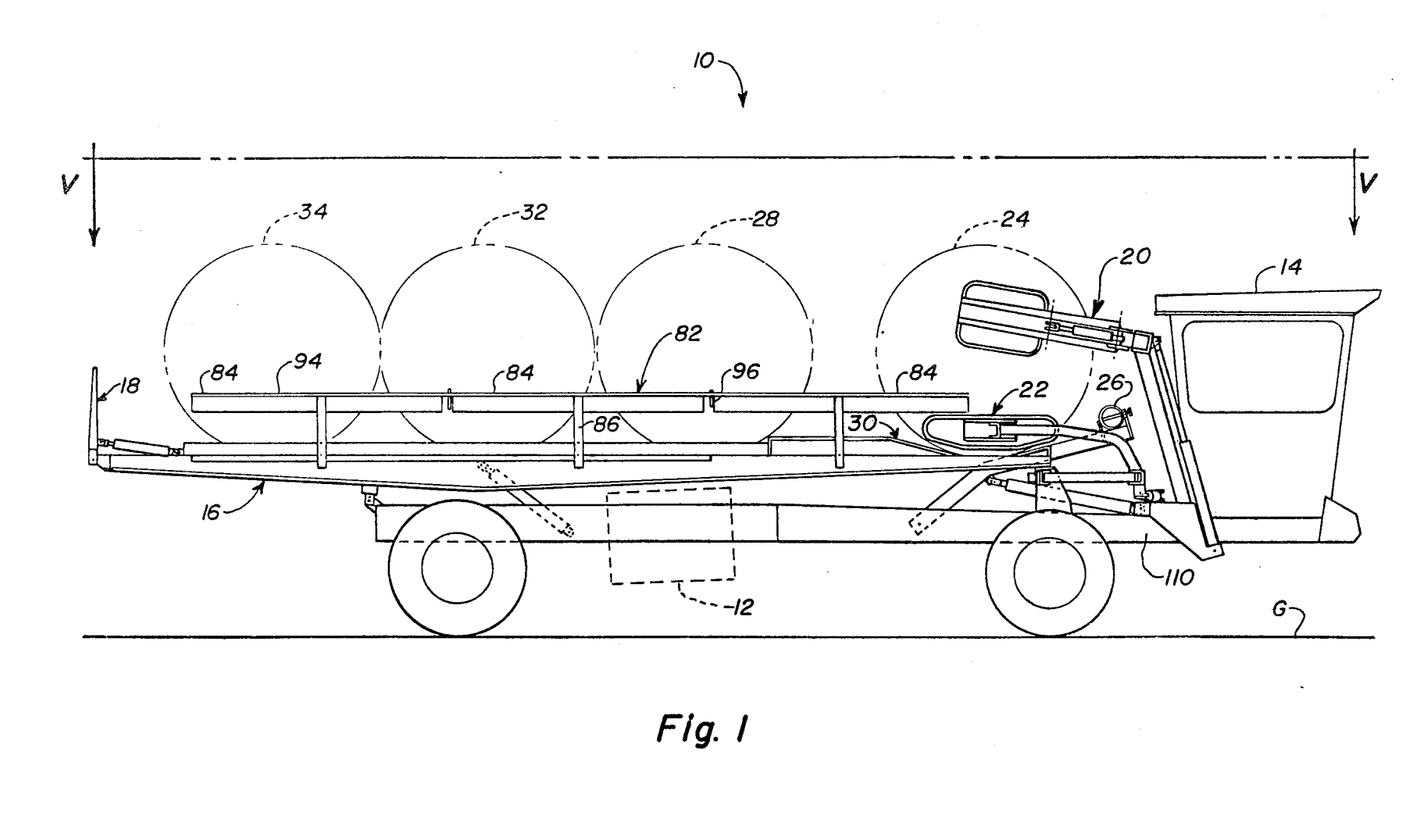
FIG. 1 is a side elevational view illustrating an embodiment of the bale handling apparatus of this invention.
Figure 7:
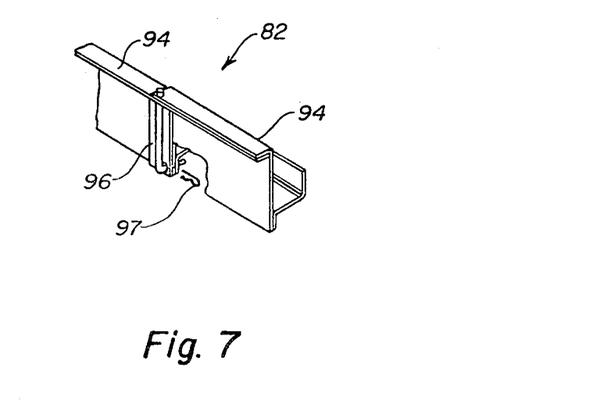
FIG. 7 is an enlarged partial view illustrating an embodiment of pins interlocking portions of the side rails of this invention.

A pair of side rails 82, FIGS. 1, 5 and 7, are connected to sides 50,52 of bed 16. Each rail 82 is connected for extending from and retracting to sides 50,52. Rails 82 are separated into a plurality of sections 84. Each section includes a single telescoping mount 86 having a first member 88 slidably mounted in a second member 90. Mounts 86 are secured in a desired position by any suitable means. Preferably though, a set screw 92 is used to secure the mounts in position. In this manner, the width of bed 16 is increased or decreased to accommodate different size bales. Also, when side rails 82 are fully retracted, the width of bed 16 satisfies the eight foot requirement for over the road operation without the need for a permit. A rail portion 94 secured to each mount 86 is connected to adjacent rail portions 94 by interlocking pins 96,97. Side rails 82 also include bed extensions 98 connected to side tails 82 and pivotal to a position lying substantially in a plane with surface 38 of bed 16. This provides support for the edges of bales when side rails 82 are extended and also provides means for adjusting a first width WB of bed 16.

As an example only, the discussion herein is directed to loading bales in a two wide either side-by-side or end-to-end arrangement of five or six foot round bales, it is recognized that with modification of bed 16, bale retainer means 30 can be used in combination with a three wide side-by-side (or end-to-end) arrangement of four foot bales or a single wide arrangement of possible eight foot bales. The three wide arrangement would, of course, require two operations of cross conveyor means 22 whereas the single wide arrangement would not require any operation of the cross conveyor means 22. In any of the above described arrangements, bale retainer means 30 will function to retain a bale or bales in a certain position after being deposited by pickup means 20, and then, after movement of the bale or bales by advance means 26, retainer means 30 will function to retain same by another position so as not to interfere with subsequent bales being deposited and cross-conveyed. Appropriate hydraulic controls can be provided to cope with any of the above arrangements. Such provision would require flexibility in selection or sequencing of pickup 20, cross-conveyor 22 and advancer 26.

Figure 2:
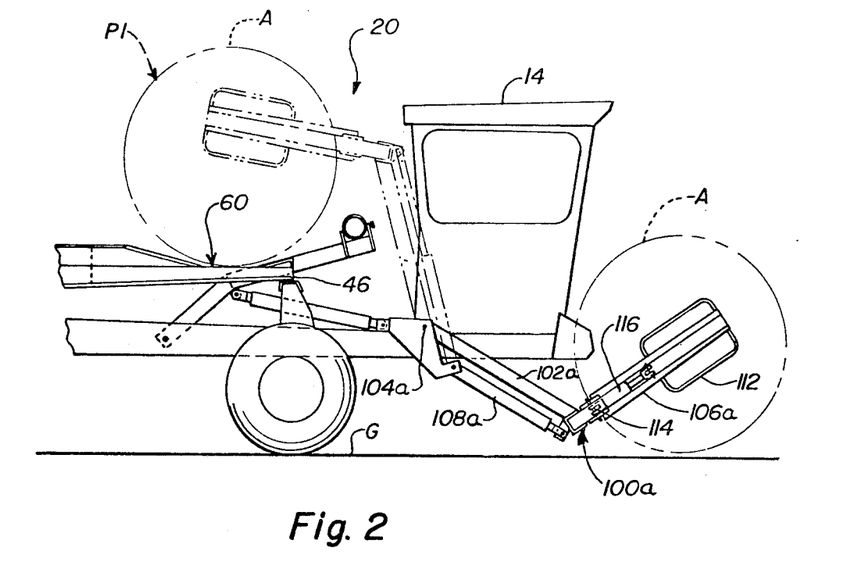
FIG. 2 is a partial side elevational view illustrating an embodiment of the bale pick up means of this invention.
Figure 6:
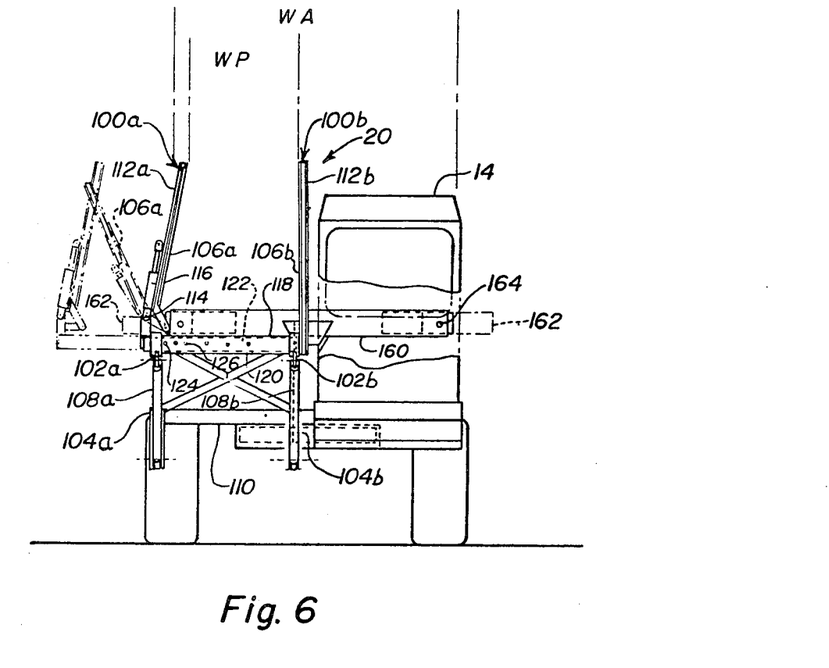
FIG. 6 is a partially cut-away frontal view illustrating an embodiment of the bale handling apparatus of this invention.

Pickup means 20, FIGS. 2 and 6, is connected to frame 36 of vehicle 10 adjacent first end 46 of bed 16 and also positioned beside offset cab 14. In this manner, maximum visibility is available to an operator positioned in cab 14.

Pickup means 20 is illustrated in solid line pickup position picking up a bale A from adjacent ground surface G. Pickup means 20 is also illustrated in a dotted line position depositing bale A in engagement with first portion 60 of retainer 30 on bed 16. Pickup 20 includes a pair of arms 100a,b. Each arm includes a first portion 102a,b pivotally connected at 104a,b to a portion of undercarriage 110 of vehicle 10 and a second portion 106a,b connected to first portion 102a,b. A pair of hydraulic cylinders 108a,b are operably connected between undercarriage 110 and each arm 100a,b for pivoting arms 100a,b between the pickup and deposit positions previously described.

Each arm 100a,b also includes an enlarged frame-like member 112a,b connected at one end to provide an enlarged area of engagement with a bale. Portion 106b of arm 100b located immediately adjacent cab 14, is fixedly attached to its respective first portion 102b. However, portion 106a of arm 100a located not as immediately adjacent cab 14, is pivotally attached to its respective first portion 102a at 114. Another hydraulic cylinder 116 is operably connected for pivotally moving portion 106a toward and away from portion 106b thus providing a secure squeeze-like engagement for picking up and depositing bales.

A cross member 118 interconnects arms 100a,b. Cross member 118 includes a first portion 120 and a cooperating telescoping portion 122 slidingly engaged with member 120. A pin 124 can be inserted at selected ones of a plurality of matched holes 126. Thus, pickup means 20 has a first width WP as viewed in FIG. 6, and that width is adjustable by means of selected adjustment of telescoping portion 122 and securing pin 124 in the appropriate one of the matched holes 126.

Figure 9:
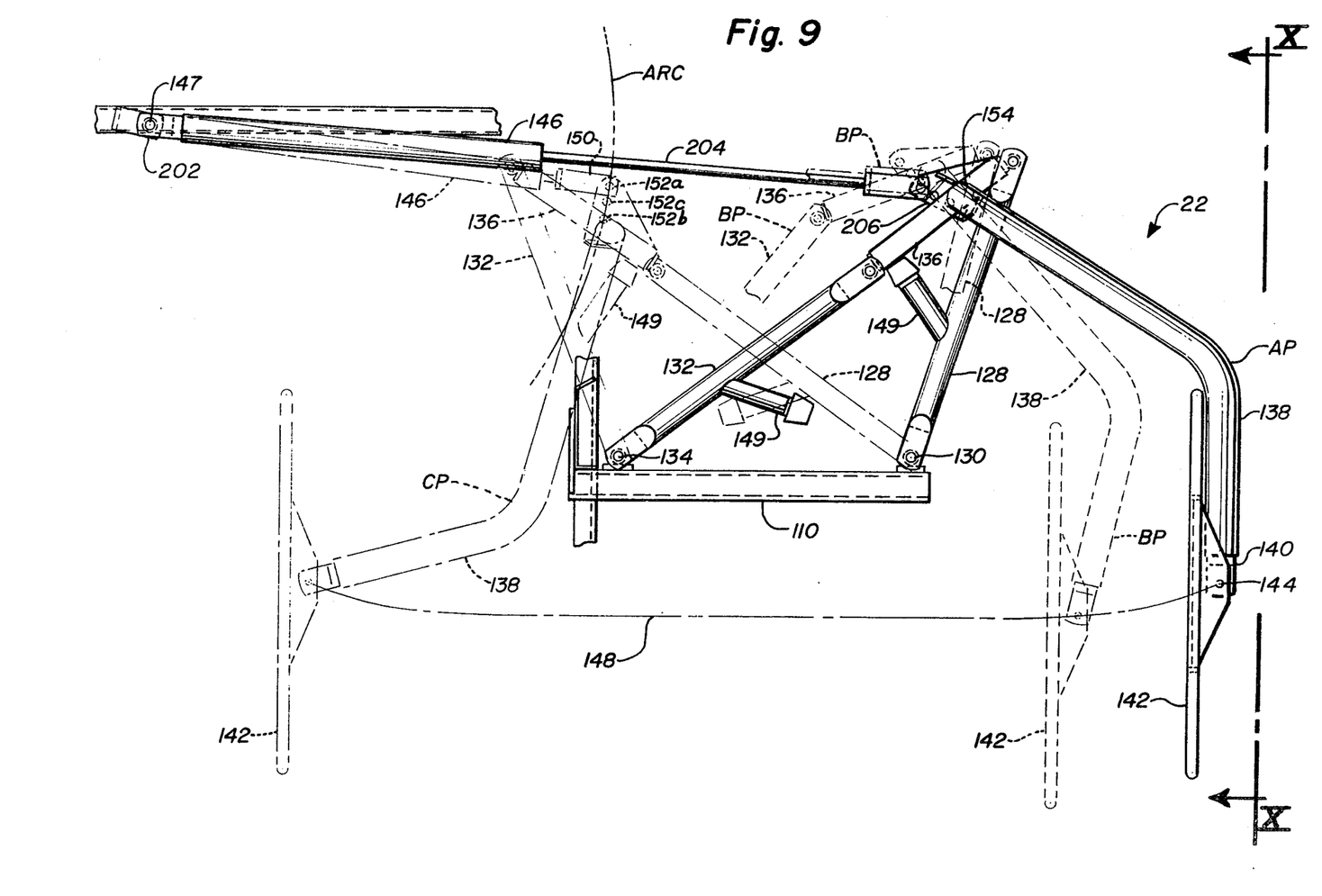
FIG. 9 is a partial plan view illustrating an embodiment of the adjustable cross-conveyor of this invention.

Cross-conveyor means 22, FIGS. 1 and 5, is pivotally connected to undercarriage 110. A linkage includes a first member 129 pivotally connected to undercarriage 110 at 130, a second member 132 pivotally connected to undercarriage 110 at 134, and a third member 136, having a length less than members 128,132 and pivotally interconnecting members 128 and 132. A cross conveyor arm 138 is connected to third member 136 preferably by welding. At one end 140 of arm 138 a frame like member 142 is pivotally connected at 144 for continuously engaging and following a bale during cross-conveying. A hydraulic cylinder 146 is pivotally connected to the undercarriage 110 at 147 and to arm 138 for moving arm 138 during cross conveying. The above described linkage is of a construction sufficient for moving end 140 of arm 138 along a substantially straight line as indicated by an arrow designated 148. Actually, however, an exaggerated view in FIG. 9 illustrates that end 140 does not move along an absolute straight line. This provides minimum distortion of the cross-convey path of a bale. By attachment of end 150 of a piston rod portion 204 of hydraulic cylinder 146 to one of a selected hole 152 provided at an end 154 of arm 138, the initial position AP of arm 138 can be adjusted relative to bed 16 (see also FIG. 8).

Figure 10:
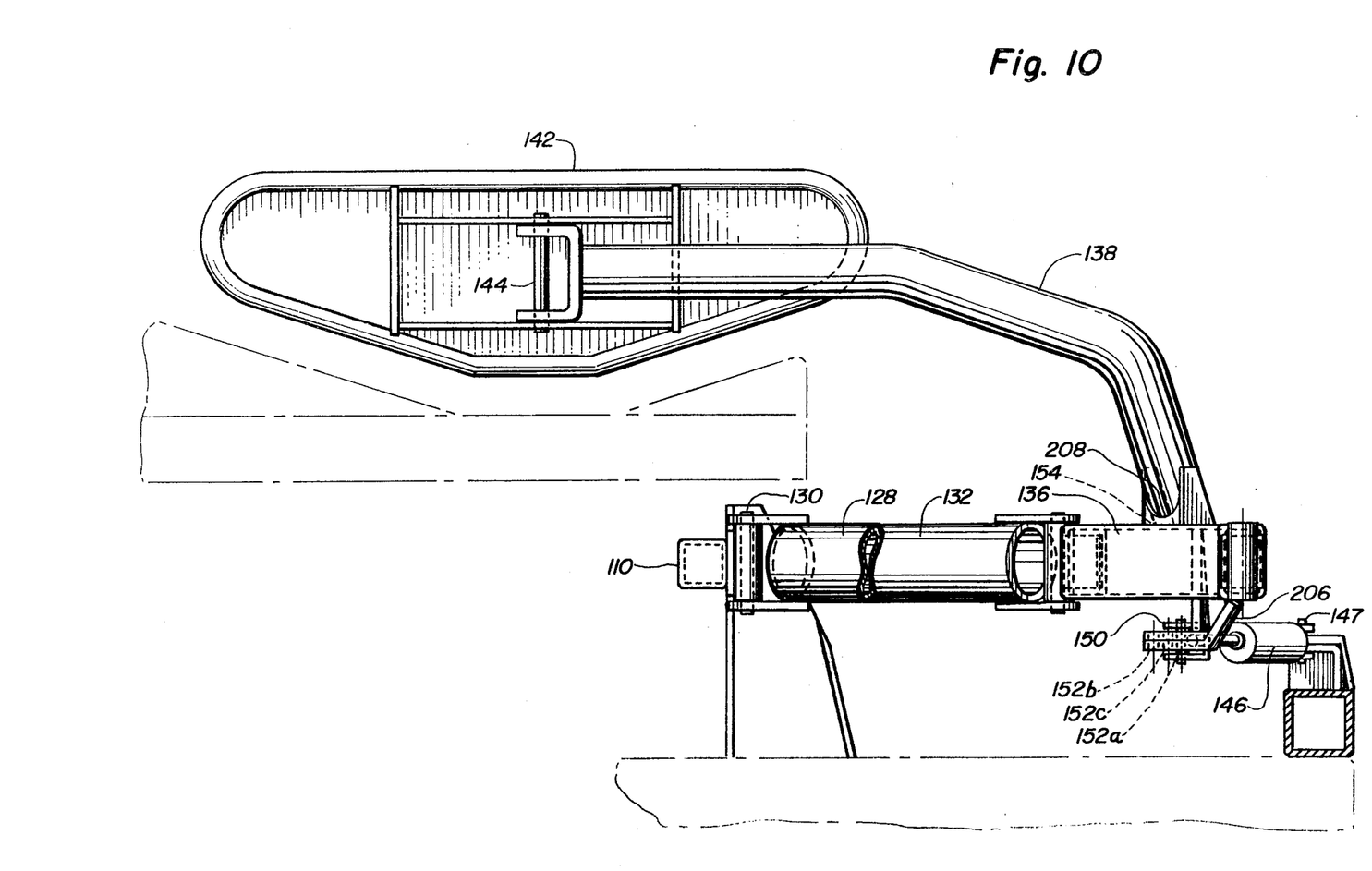
FIG. 10 is a partial side elevation illustrating the adjustable cross-conveyor viewed along line X—X of FIG. 9.

Cross conveyor means 22, FIGS. 9 and 10, is adjustable for reciprocably moving arm 138 from variable first positions AP,BP to a substantially consistent second position CP. This is accomplished by pivotally connecting one end 202 of hydraulic cylinder 146 to undercarriage 110. Piston rod 204 extends from and retracts into cylinder 146. End 150 of piston rod 204 is provided for pivotal attachment to arm 138. Where piston rod 204 is fully retracted into cylinder 146, pivotal movement of piston rod 204 and cylinder 146 defines an arc designated by the line ARC.

An adjustment plate 206 is connected preferably by welding to member 136. Plate 206 includes a plurality of adjustment positioners such as holes 152a, 152b, 152c formed therein for pivotal connection to end 150 of piston rod 204. Member 136 includes a recess portion 208 for fixedly receiving end 154 of arm 138.

When end 150 of piston rod 204 is connected at positioner 152a, arm 138 is movable to an initial solid line position AP. When end 150 is connected at positioner 152b, arm 138 is movable to another initial position 152b, arm 138 is movable to another initial position BP, shown in broken line. Although it is not shown, an intermediate initial position is attainable between positions AP,BP, when end 150 of piston 204 is connected at positioner 152c. The variable initial positions locate frame member 142 immediately adjacent bales of varying size which may be deposited on bed 16 during a given operation. For example, if a field is filled with six foot wide round bales, arm 138 may be preset to the initial (not shown) intermediate position described above. By positioning frame member 142 immediately adjacent the bale, an impact load is avoided when arm 138 is moved for cross-conveying. Also cycle time and overall width can be reduced.

Since the length of the stroke of piston rod 204 remains the same relative to cylinder 146, end 150 of piston rod 204 cyclically moves to a position along arc ARC regardless of which positioner 152a, 152b, 152c is engaged by end 150. As a result, arm 138 cyclically moves to a substantially consistent second position CP (shown in broken line). Thus delivering a bale to a substantially consistent position on bed 16 regardless of the adjusted initial position of arm 138. Preferably, a pair of stops 149 are connected to members 128,132 to limit buckling of the linkage when cross-conveyor 22 is in either of its extreme positions AP,CP.

Figure 3:
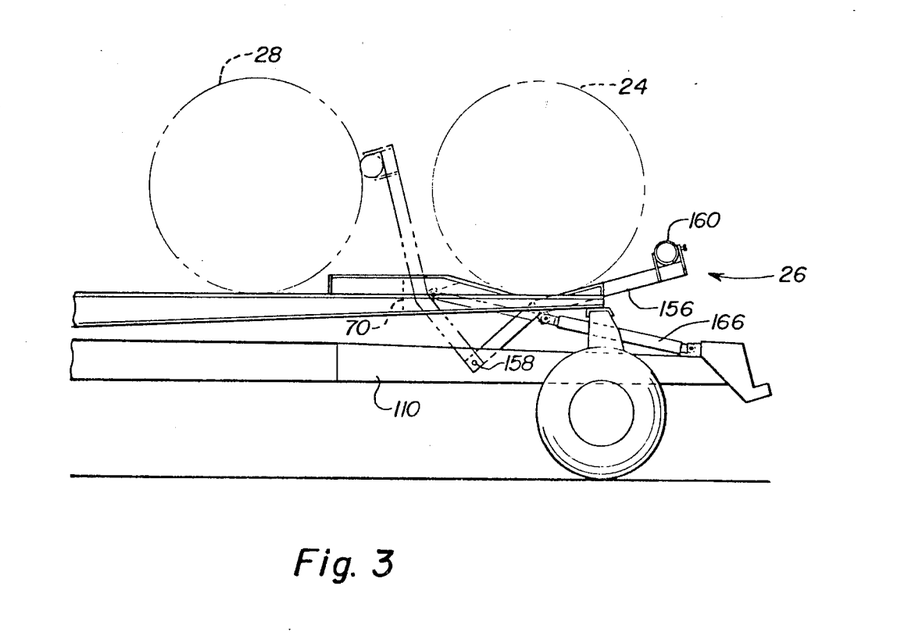
FIG. 3 is a partial side elevational view illustrating an embodiment of the bale advance means of this invention.

Advance means 26, FIGS. 3 and 6, includes a first member 156 pivotally connected to undercarriage 110 at 158. A transversely disposed member 160 is connected to first member 156 and is substantially tubular including tubular extensions 162 telescopingly mounted in member 160. Extensions 162 can be moved for adjusting the first width WA of advancer 26 when different size bales are to be encountered. Extensions 162 are secured in a desired position with member 160 by means of set screws 164. A hydraulic cylinder 166 is operably connected to the undercarriage and first member 156 for pivoting advancer 26 in slot 70 and thereby moving bales from a first row position 24 to a second row position 28.

With the parts assembled as set forth above, vehicle 10 is maneuvered over the ground surface G traveling the same path as a baler and approaching a scattered array of round bales left in a field by the baler. As pickup means 20 is lowered into the solid line pickup position for picking up a bale A, portion 106a of arm 100a pivots away from portion 106b of arm 100b thus opening arms 100a,b for picking up bale A. Once bale A is engaged, arm portion 106a pivots toward portion 106b for clamping bale A.

Pickup means 20 is then rotated to the dotted line position for depositing bale A in a first position P1 in first portion 60 of retainer 30. Arm 100a pivots open before pickup means 20 rotates down to the pickup position for the next bale and cross conveyor means 22 urges bale A to a second position P2 in first portion 60 of retainer 30. Thus, first portion 60 of retainer 30 retains bale A in a first position P1, in a second position P2 and guides the travel of bale A from the first to the second position. Due to piston being connectable to one of a plurality of positioners varying size bales can be cross conveyed from a varying first position P1 to a substantially consistent second position P2.

Subsequently, bale B is picked up and deposited in the first position P1 by pickup means 20 and bales A,B form a two wide side-by-side or end-to-end first row 24 of bales in first portion 60 of retainer 30.

Advance means 26 is then actuated for urging first row 24 to the second row 28 position. The bales A,B are retained in the second row 28 by stops 66 and are displaced from first row 24 so as not to interfere with subsequent bales being placed in the first row 24.

The cycle is repeated until third and fourth rows 32,34 are filled. (Five rows (not shown) can be made when 4½ foot bales are being handled). This operation is accomplished as vehicle 10 moves over ground surface G at a substantially constant speed of about four miles per hour. Once bed 16 is filled with a load of bales, vehicle 10 is driven to a selected storage area where the load of bales is dumped by actuating bed 16 and gate 18.

Repeated loading, transporting and dumping will quickly and efficiently move a large number of bales from the scattered array of bales in the field.

The foregoing has described a bale handling apparatus adaptable for continuous movement at a substantially constant speed when picking up many large round bales, arranging the bales in rows on a bed of the apparatus and subsequently depositing the rows of bales at a storage area.

It is anticipated that aspects of the present invention, other than those specifically defined in the appended claims, can be obtained from the foregoing description and the drawings.

Having described the invention, what is claimed is:

1. In combination with a bale handling apparatus of the type having a bed mounted on a frame, a bale retainer connected to the bed, means for depositing bales in a first position in said retainer and means for cross conveying said bales to a second position in said retainer, the improvement comprising:
   (a) a linkage connected to the frame, said linkage including first and second members pivotally connected to said frame, said first and second members being pivotally interconnected by a third member having a length less than the length of said first and second members;
   (b) a cross conveyor arm connected for movement with the linkage; and
   (c) means for reciprocally moving said cross conveyor arm from a variable first position to a substantially consistent second position, said means including a hydraulic cylinder, a piston and an adjustment plate fixedly connected to said third member, said piston movable between a retracted position and an extended position, said cylinder having a first end pivotally connected to said frame and said piston having a second end connected for moving said linkage, said adjustmemt plate connected for movement with the arm and having a plurality of adjustment positioners along an arc on said plate, said second end of said piston being pivotally connected to one of said positioners.

2. The apparatus of claim 1 wherein said arc is defined by said second end of said piston pivoting in said retracted position about said first end of said cylinder.

3. An adjustable cross-conveyor apparatus comprising:
   (a) a frame;
   (b) a linkage connected to the frame, said linkage including first and second members pivotally connected to said frame, said first and second members pivotally interconnected by a third member having a length less than the length of said first and second members;
   (c) a cross-conveyor arm connected for movement with the linkage; and
   (d) means for reciprocally moving said cross-conveyor arm from a variable first position to a substantially consistent second position, said means including a hydraulic cylinder, a piston and an adjustment plate, said piston movable between a retracted position and an extended position, said cylinder having a first end pivotally connected to said frame and said piston having a second end connected for moving said arm and pivotal through an arc defined by said second end in response to said piston pivoting in said retracted position, said adjustment plate connected between said cross-conveyor arm and said third member of said linkage and having a plurality of adjustment positioners formed on said adjustment plate, said positioners having their geometric centers positioned along said arc.

4. A cross-conveying apparatus comprising:
means for cross-conveying various size bales from a varying first position to a substantially consistent second position, said means including a linkage having first and second members pivotally connected to and supported by a frame, said first and second members being pivotally interconnected by a third member having a length less than the length of said first and second members, said means further including a cross-conveyor arm connected to the linkage by an adjustment plate fixedly connected to said third member, said plate having a plurality of adjustment positioners along an arc on said plate;
a hydraulic cylinder having an end pivotally connected to said frame; and
a piston extendable from and retractable into said cylinder said piston having an end pivotally connected to said plate, said arc defined by said piston end in response to said piston being retracted into and pivoting with said cylinder.

* * * * *